US010633621B2

(12) United States Patent
Lueers et al.

(10) Patent No.: US 10,633,621 B2
(45) Date of Patent: Apr. 28, 2020

(54) BEER CLARIFICATION AID BASED ON SILICA XEROGEL WITH HIGH FILTERABILITY

(75) Inventors: Georg Lueers, Westhofen (DE); Massoud Jalalpoor, Schifferstadt (DE); Dominik Sedlmayer, Westhofen (DE); Andreas Seewald, Worms (DE)

(73) Assignee: Grace GmbH, Worms (DE)

( * ) Notice: Subject to any disclaimer, the term of this patent is extended or adjusted under 35 U.S.C. 154(b) by 830 days.

(21) Appl. No.: 12/309,984

(22) PCT Filed: Jul. 27, 2007

(86) PCT No.: PCT/EP2007/006687
§ 371 (c)(1),
(2), (4) Date: Dec. 24, 2009

(87) PCT Pub. No.: WO2008/017393
PCT Pub. Date: Feb. 14, 2008

(65) Prior Publication Data
US 2010/0112132 A1     May 6, 2010

Related U.S. Application Data

(60) Provisional application No. 60/836,091, filed on Aug. 7, 2006.

(51) Int. Cl.
| | | |
|---|---|---|
| C12H 1/048 | (2006.01) | |
| C12H 1/044 | (2006.01) | |
| B01J 20/10 | (2006.01) | |
| B01J 20/28 | (2006.01) | |
| C12H 1/07 | (2006.01) | |

(52) U.S. Cl.
CPC ......... *C12H 1/0408* (2013.01); *B01J 20/103* (2013.01); *B01J 20/28004* (2013.01); *B01J 20/28016* (2013.01); *B01J 20/28047* (2013.01); *B01J 20/28061* (2013.01); *B01J 20/28069* (2013.01); *C12H 1/063* (2013.01)

(58) Field of Classification Search
CPC ............... B01J 20/103; B01J 20/28004; B01J 20/28016; B01J 20/28061; B01J 20/28069; B01J 20/28047; C12H 1/063; C12H 1/0408
USPC ............................ 426/330.3, 330.4, 330.5
See application file for complete search history.

(56) References Cited

U.S. PATENT DOCUMENTS

| | | | |
|---|---|---|---|
| 3,163,538 A * | 12/1964 | Raible ................. | C12H 1/0408 426/16 |
| 4,053,565 A * | 10/1977 | Krekeler et al. ............... | 423/338 |
| 4,515,821 A | 5/1985 | Armstead et al. | |
| 4,636,394 A | 1/1987 | Hsu | |
| 5,232,724 A | 8/1993 | Aldcroft et al. | |
| 5,622,743 A | 4/1997 | Tanaka et al. | |
| 5,643,624 A | 7/1997 | Aldcroft | |
| 6,103,004 A | 8/2000 | Belligoi et al. ............... | 106/482 |
| 6,565,905 B1 | 5/2003 | Ito et al. | |
| 2004/0043119 A1 | 3/2004 | Rehmanji et al. ............. | 426/422 |
| 2004/0062835 A1 | 4/2004 | Earl et al. ........................ | 426/11 |
| 2004/0099184 A1 | 5/2004 | Palm et al. .................... | 106/409 |
| 2005/0142258 A1 | 6/2005 | Hu et al. | |

FOREIGN PATENT DOCUMENTS

| | | |
|---|---|---|
| DE | 1767324 | 3/1976 |
| EP | 0188882 | 7/1986 |
| GB | 0938153 | 10/1961 |
| GB | 0981715 | 1/1965 |
| GB | 1279250 | 6/1972 |
| JP | 05097421 | 4/1993 |
| JP | 1993177132 | 7/1993 |
| JP | 1996198616 A | 2/1998 |
| JP | 2003190781 A | 7/2003 |
| RU | 2160777 A | 12/2000 |
| RU | 2264445 A | 11/2005 |
| SU | 1212942 A | 2/1986 |

* cited by examiner

*Primary Examiner* — Vera Stulii

(57) ABSTRACT

A composition useful for the treatment of beverages comprising xerogel particles having a pore volume of from about 0.2 to about 2.0 m²/g, a median particle size of from about 5 to about 40 microns, wherein the composition comprises less than about 30% by weight of fines.

24 Claims, No Drawings

BEER CLARIFICATION AID BASED ON SILICA XEROGEL WITH HIGH FILTERABILITY

CROSS-REFERENCE TO RELATED APPLICATIONS

This patent application is a national stage patent application of International Patent Application No. PCT/EP2007/006687, filed on Jul. 27, 2007 and entitled "BEER CLARIFICATION AID BASED ON SILICA XEROGEL WITH HIGH FILTERABILITY," which claims the benefit of priority to U.S. Provisional Patent Application Ser. No. 60/836,091 filed on Aug. 7, 2006 and entitled "BEER CLARIFICATION AID BASED ON SILICA XEROGEL WITH HIGH FILTERABILITY," the subject matter of both of which is hereby incorporated by reference in their entirety.

BACKGROUND

This invention relates to a xerogel, a method of making a xerogel, and a method of treating beverages with a xerogel.

The clarity of beer is an important factor influencing consumer acceptance. The presence of haze in beer is usually associated with inferior quality. Haze in beer is, however, a natural phenomenon and proper treatment is required to prevent or delay its formation. Chill-haze is formed by haze sensitive proteins. Materials that remove haze sensitive proteins should be allowed under the German Purity Law, otherwise known as "Reinheitsgebot". An alternative to the use of chemical additives in alignment with this law is the use of silica gel that results in removal of haze-sensitive proteins. Finally all materials used for removal of haze sensitive proteins must be removed from the beer.

There are a number of silica based beer stabilisation or clarification agents on the market. They can be divided into two groups, hydrogels and xerogels. Both gels are produced using similar processes as described in many publications, such as U.S. Pat. Nos. 4,515,821; 4,636,394; 5,622,743; and 6,565,905, the entire subject matter of which is incorporated herein by reference. The hydrogels typically include 55 to 70% by weight of water and 45 to 30% by weight of silica with a purity of 99.0% (after calcination). Hydrogels are milled to the desired particle size using common milling techniques. For xerogels, water is typically removed prior to milling using common drying processes, with the resulting xerogels possessing less than about 70 to 80% by weight water. Both gels are generally milled in similar fashion. For both gels, the particle size is adjusted to the desired value using available process control parameters during milling. The inner structure of the gels in terms of surface area, pore volume, pore size distribution, etc., are modified utilizing processing conditions during an aging process of the gels, which typically occurs after formation of the particle and are well known in the literature. Pore volume and surface area are measured using the nitrogen adsorption (BET) at low temperature and calculated using the Kelvin equation (e.g., DIN 66131). For the hydrogels, such parameters are typically not measured in this fashion due to the presence of water in the pores. In addition, drying before measurement is not possible because this process changes the structure of the gel.

Xerogels and hydrogels differ significantly in their behavior in terms of efficiency in stabilisation and filterability. While the xerogels offer high performance in the improvement of stability, the hydrogels are significantly better in the filterability at the same solid concentrations in the beer. Accordingly, it is usually necessary to use two to three times the amount of a hydrogel than would be necessary using a xerogel.

Another important property of a beer stabilisation aid gel relates to the particle size and the particle size distribution. The average particle size of such product that are commercially available typically lies between 5 and 40 microns. Particle size of such gels significantly affects efficiency (i.e., removal/adsorption of haze sensitive high molecular weight proteins) and filterability. A fine sized particle generally possesses good performance in improving the stability but requires additional time for filtration. This relationship typically applies equally for xerogels as for hydrogels.

Important also for the efficiency in terms of stability of beer is the size of accessible surface of the silica. Silica gels are amorphous, inert particulates with open pores and large surface areas. Typically, preferred silica gels are those with high surface areas and large pores, which allow the haze forming molecule to be adsorbed on the silica surface.

Accordingly, there is a need in the industry for a beverage-stabilizing agent that possesses acceptable stabilization properties and is also readily filterable.

SUMMARY

The present invention relates to a composition useful for the treatment of beverages comprising xerogel particles having a pore volume of from about 0.2 to about 2.0 ml/g, a median particle size of from about 5 to about 40 microns, wherein the composition comprises about 30% or less by weight of fines.

The present invention also relates to a method of making a xerogel composition useful for the treatment of beverages comprising preparing a hydrogel; heating the hydrogel to form a xerogel; milling the xerogel to form particles in the composition; and removing at least 5% by weight of fines from the composition.

The present invention further relates to a method of treating a beverage comprising, providing a xerogel composition; providing a beverage; and filtering said beverage with said xerogel composition, wherein said composition comprises xerogel particles having a pore volume of from about 0.2 to about 2.0 ml/g, a median particle size of from about 5, to about 40 microns, wherein the composition comprises about 30% or less by weight of fines.

DETAILED DESCRIPTION

The present invention relates to a beer clarification aid based on a xerogel, which has high performance in beer clarification typical for a xerogel with the benefit of possessing comparable filterability as a hydrogel based clarification aid.

As referred to herein, the term "fines" is defined as particles having a particle size of less than about 10 microns as measured by a micro precision sieve Type LTG-Siebvibrator available from Retsch GmbH. The surface area (BET), as referred to herein, is measured by nitrogen adsorption using DIN 66131, and the pore volume is determined with an ASAP 2400 available from Micromeritics Instrument Corp. As referred to herein, the median of the volume-related particle size is measured by light diffraction using a Malvern Mastersizer 2000 available from Malvern Instruments Ltd. Moisture content of the xerogel is measured by the coulometric determination of water content by the Karl Fischer Method using ASTM D6869. The term "filterability, " otherwise known as permeability is a measure of the ability of a porous material to transmit fluid and is defined by Darcy's law and is determined using TS 72 by measuring the permeability of filter aids according to EBC norm using standard EBC filters. This method may be found in Section 10.9 of the book entitled "Analytica-EBC" available from Fachverlag Hans Carl (ISBN 3-418-00759-7). The EBC filters are available from VEL S.A. under the name "Normfilter EBC."

In one embodiment, the present invention relates to a composition useful for the treatment of beverages comprising xerogel particles having a pore volume of from about 0.2 to about 2.0 ml/g, a median particle size of from about 5 to about 40 microns, wherein the composition comprises about 20% or less by weight of fines based on the total weight of the composition. In this embodiment, the composition may include about 18% or less by weight fines, and typically about 17% or less by weight fines, more typically about 15% or less by weight fines, and even more typically about 13% or less by weight fines. The xerogel generally comprises moisture in an amount of 20% by weight or less, and more typically 0 to 10% by weight of the composition. The pore volume of the xerogel particles more preferably ranges from about 0.2 to about 2.0 ml/g, and even more preferably from about 0.4 to about 1.5 ml/g. The median particle size (V0.5) preferably ranges from about 5 to about 40 microns, and even more preferably from about 10 to about 25 microns. In this embodiment, the particles possess a surface area ranging from about 200 to about 900 $m^2/g$, and preferably from about 400 to about 800 $m^2/g$. Even though the xerogel preferably is silica, other inorganic oxides may be utilized in the present composition including alumina, titania or mixtures thereof.

The present invention also relates to a method of making a xerogel composition useful for the treatment of beverages comprising preparing a hydrogel; heating the hydrogel to form a xerogel; milling the xerogel to form particles in the composition; and removing at least 5% by weight of fines from the composition. Preferably, at least about 10% by weight of fines are removed from the composition, more preferably at least about 20% by weight of fines are removed from the composition, and even more preferably at least about 30% by weight of fines are removed from the composition.

The following describes a method of manufacturing silica gels according to an embodiment of the invention and other inorganic oxide gels may be produced in a similar fashion as is well known by one of ordinary skill in the art. The silica hydrosol is prepared by reacting silicate with inorganic acid such that the $SiO_2$ concentration is between 10 and 25% by weight and gelled. Excessively low $SiO_2$ concentration may lengthen the period of gelation time, increase water content, and deteriorate efficiency in the subsequent washing and drying steps, which is industrially impractical. Excessively high $SiO_2$ concentration could excessively accelerate the gelation process, and the silica hydrogel having uniform physical properties could not be obtained. As the silicate, sodium silicate, potassium silicate, ammonium silicate or other is available: sodium silicate is most used industrially. For the inorganic acid, sulfuric acid, nitric acid, hydrochloric acid or other is, available: sulfuric acid is generally used.

Subsequently, by washing the silica hydrogel with water, inorganic salt is removed. When the washed silica hydrogel is hydrothermally treated with water having a pH of 2-10 at a temperature of 20-100° C., the average pore diameter and the pore volume are increased. In this process, if the silica hydrogel is washed with water under the conditions corresponding to those for the hydrothermal treatment, the washing and the hydrothermal treatment can be carried out simultaneously. For the conditions of the hydrothermal treatment, when the pH or the temperature is increased, the specific surface area tends to lower largely. When the pH or the temperature is lowered, the treatment time tends to be lengthened. Accordingly, the silica hydrogel is desirably hydrothermally treated at a pH of 6-8.5 and a temperature of 40-80° C. In the hydrothermal treatment, primary particles of silica gel are solubilized and deposited, and the specific surface area of the silica gel is decreased while the average pore diameter and the pore volume are increased. Therefore, the specific surface area is quite gradually decreased while the average pore diameter and the pore volume are increased. The primary particles obtain an increased binding strength at the point where the primary particles combine with each other and the structure of the silica gel is stabilized and strengthened.

The water washing process and the hydrothermal treatment process may be serially carried out, or the two processes may be performed at the same time.

The washed and hydrothermally treated silica hydrogel possesses a relatively large average pore diameter, pore volume and specific surface area.

In order to provide a xerogel according to the invention, the hydrogel is dried by blowing air at a temperatures ranging from 100 to 180° C. through the hydrogel bed until the moisture in the gel is less than about 20%, preferably less than about 10%, and more preferably less than about 5% by weight. Subsequently, the xerogel is milled using a conventional mill to the desired particle size. Processes for making xerogels may be found in U.S. Pat. Nos. 6,565,905 and 5,622,743.

Following formation of the milled xerogel, fines generated intrinsically during the milling are removed using an air-classifier or other similar device that is suitable for this process. Air classifiers, well known in the industry, use an aerodynamic process to cut the input particle size distribution into a fine and a coarse fraction. The cut size between the fine and the coarse fraction may be adjusted and in this invention is used to control the filterability. In order to provide a xerogel beer clarification aid with filterability similar to that of a hydrogel clarification aid, the total fines in the xerogel composition may reduced to about 20% or less by weight, typically about 18% or less by weight, more typically about 17% or less by weight, and even more typically about 15% or less by weight based on the total weight of the composition.

The xerogel produced according to the present invention may be utilized as a clarification and stabilization aid in a variety of beverages, including beer, wine and fruit juices. Processes for clarifying beverages are generally known in the industry and include those described in U.S. Pat. Nos. 5,622,743 and 6,565,905 of which the entire contents are incorporated herein by reference. The clarifying aid of the present invention is typically added to a beverage prior to filtering in an amount of from about 0.1 to about 1.0 g/l, preferably from about 0.2 to about 0.8 g/l, and more preferably from about 0.3 to about 0.7 g/l. The beverage is generally treated for at least 30 minutes with the clarification aid, and typically for at least 2 hours. This is generally done by adding the clarification aid in the lagering tank or clarification tank prior to filtering. However, the clarification aid may also be utilized in a continuous beverage manufacturing or clarification process. Other additives may be used with the clarification aid of the present invention, including filtering aids. Generally, the beverage is filtered for at least an hour, preferably at least 2 hours, employing a diatomaceous earth filter machine or with membrane filtration equipment.

In one embodiment, green beer is manufactured by fermenting and aging the beer in a lagering tank for about one month. The clarification aid of the present invention is added to the tank and is brought in contact with the beer for at least 15 minutes. Subsequently, the beer is filtered at 2° C. for 3 hours through a diatomaceous earth filter having a filtration area of 0.2 m$^2$ at a flow rate of 500 liters/m$^2$/hour. The filtered beer is then bottled.

Stability of beverages treated with the clarification aid of the present invention may be measured by ammonium sulfate number at 40 g/hl. Generally, such treated beverage possesses an ammonium sulfate number of greater than about 10, preferably greater than about 12, more preferably greater than about 14, and even more preferably greater than about 15. The ammonium sulphate value is a measure of the amount of high molecular weight protein in beer, which is an indicator of the success of the stabilisation of the beer from the aspect of protein removal. The physical stability of a beer depends, amongst other factors, on the quantity of soluble high molecular weight protein, the level of polyphenols and the oxygen levels to which the beer has been exposed. The temperature- and oxygen-dependent chemical reaction between proteins and polyphenols leads to a chill-haze at temperature around 0° C. and thus to the instability of the beer. By selective adsorption using beer clarification agents, the content of dissolved protein can be reduced and thus the stability of the beer improved. The addition of a saturated ammonium sulphate solution to the beer results in the precipitation of the high molecular weight proteins. The quantity of ammonium sulphate solution added and the resulting turbidity of the beer are measured using the PT Standard instrument. This method is the MEBAK 2.19.2.5 method (MEBAK=Middle European Brew Analyses Convention).

The filterability of the clarification aid of the present invention is generally greater than about 35 mDarcy, preferably greater than about 40 mDarcy, more preferably greater than about 45 mDarcy, and even more preferably greater than about 50 mDarcy. Typically, the filterability ranges from about 35 mDarcy to about 1000 mDarcy, preferably from about 40 mDarcy to about 500 mDarcy, more preferably from about 45 mDarcy to about 300 mDarcy, and even more preferably from about 50 mDarcy to about 200 mDarcy.

While the invention has been described with a limited number of embodiments, these specific embodiments are not intended to limit the scope of the invention as otherwise described and claimed herein. It may be evident to those of ordinary skill in the art upon review of the exemplary embodiments herein that further modifications and variations are possible. All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, $R_L$, and an upper limit $R_U$, is disclosed, any number R falling within the range is specifically disclosed. In particular, the following numbers R within the range are specifically disclosed: $R=R_L+k(R_U-R_L)$, where k is a variable ranging from 1% to 100% with a 1% increment, e.g., k is 1%, 2%, 3%, 4%, 5% . . . 50%, 51%, 52% . . . 95%, 96%, 97%, 98%, 99%, or 100%. Moreover, any numerical range represented by any two values of R, as calculated above is also specifically disclosed. Any modifications of the invention, in addition to those shown and described herein, will become apparent to those skilled in the art from the foregoing description and accompanying drawings. Such modifications are intended to fall within the scope of the appended claims.

ILLUSTRATIVE EXAMPLES

The following Examples are given as specific illustrations of the claimed invention. It should be understood, however, that the invention is not limited to the specific details set forth in the Examples.

Example 1

In this example, a conventional silica hydrogel is produced according the state of the art, targeting a surface area of 500 m2/g. The silica is then milled using an ACM 30 mill available from Hosokawa to a particle size of 17.6 microns. This product is well known in the market under the brand name DARACLAR 920, which is available from Grace GmbH & Co. KG. Various properties of this sample (Sample A) are measured and filterability performance is evaluated. The results are presented in Table 1.

Example 2

In this example, a hot stream of air at 150° C. in a fixed bed dries a hydrogel of Example 1 in order to obtain a xerogel. A jet mill using compressed air is utilized to mill the xerogel to a particle size of 16.4 microns. This product is also known in the market under the brand name DARACLAR 915 K, which is available from Grace GmbH & Co. KG. Various properties of this sample (Sample B) are measured and filterability performance is evaluated. The results are presented in Table 1.

Example 3

The xerogel from comparison Sample B (Example 2) is mechanically milled (instead of jet milled) using the ACM 30 mill, the same as for comparison Sample A, to an average particle size of 19.0 microns. This product still contains fines. Various properties of this sample (Sample C) are measured and filterability performance is evaluated. The results are presented in Table 1.

Example 4

In this example, the experimental comparison Sample C (Example 3) is classified using the Alpine TSP 315 classifier. 10% of fines are removed by this procedure. The average particle size remained relatively unchanged in the range of typical variations (18.5 microns). Various properties of this sample (Sample D) are measured and filterability performance is evaluated. The results are presented in Table 1.

The commercially available comparison product Samples A and B are in conformance with the expectations in terms of stability (i.e., ammonium sulfate number at 40 g/hl) and filterability; i.e., the xerogel (Sample B) provides high stability but has low filtration rates and the hydrogel (Sample A) provides low stability with high filtration rates.

Sample C demonstrates the effect of the mechanical milling as compared to jet milling. Both Samples B and C are prepared from the identical xerogel. As is shown in the Table, there is no significant difference in measured properties between Sample C and Sample B, indicating that either milling processes yield similar results.

The product prepared according to the present invention, Sample D, combines both preferred properties of high stability and high filtration rates. All physical and performance data are listed in Table 1.

TABLE 1

| Sample | Process | Particle size V0.5 (micron) | Fines (%) | Moisture (%) | Surface Area (m2/g) | Filterability (mDarcy) | Ammonium Sulfate number at 40 g/hl |
|---|---|---|---|---|---|---|---|
| A | Jet milling | 17.6 | 29.33 | 62.1 | n.a.* | 220 | 11.8 |
| B | Mech. Milling | 16.4 | 20.18 | 5.8 | 450 | 35.3 | 14.1 |
| C | Mech. Milling | 19.0 | 22.07 | 3.1 | 495 | 29.3 | 16.4 |
| D | Mech. Milling + Classifying | 18.5 | 14.35 | 3.9 | 490 | 160 | 15.4 |

*not available because this parameter cannot be measured for a hydrogel

What is claimed is:

1. A composition useful for the treatment of beverages comprising:
   xerogel particles having a pore volume of from about 0.4 to about 1.5 ml/g, and a median particle size of from about 10 to about 40 microns, wherein the composition has a particulate size distribution such that the composition comprises (i) about 15% or less by weight of fines and (ii) a permeability of at least about 40 Darcy.

2. A composition according to claim 1, wherein said xerogel particles comprise moisture in an amount of 20% by weight or less.

3. A composition according to claim 1, wherein said xerogel comprise silica.

4. A composition according to claim 1, wherein said median particle size ranges from about 10 to about 25 microns.

5. A composition according to claim 1, wherein said xerogel particles comprise a surface area ranging from about 200 to about 900 m$^2$/g.

6. A composition according to claim 1, wherein said composition comprises a permeability of at least about 45 mDarcy.

7. A composition useful for the treatment of beverages comprising:
   xerogel particles having a pore volume of from about 0.4 to about 1.5 ml/g, and a median particle size of from about 5 to about 40 microns, wherein said composition has a particle size distribution such that the composition comprises (i) about 20% or less by weight fines, and (ii) a permeability of at least about 40 mDarcy.

8. A composition according to claim 7, wherein said composition comprises a permeability of at least about 45 mDarcy.

9. A composition according to claim 7, wherein said xerogel particles comprise moisture in an amount of 20% or less by weight.

10. A composition according to claim 7, wherein said xerogel particles comprise silica.

11. A composition according to claim 7, wherein said median particle size ranges from about 10 to about 25 microns.

12. A composition according to claim 7, wherein the composition comprises about 15% or less by weight fines.

13. A composition according to claim 7, wherein said xerogel particles comprise a surface area ranging from about 200 to about 900 m$^2$/g.

14. A composition according to claim 1, wherein the composition comprises 10% or less by weight fines.

15. A composition according to claim 7, wherein the composition comprises 10% or less by weight fines.

16. A composition according to claim 1, wherein said composition comprises a permeability of from about 50 mDarcy to about 200 mDarcy.

17. A composition according to claim 7, wherein said composition comprises a permeability of from about 50 mDarcy to about 200 mDarcy.

18. A composition useful for the treatment of beverages comprising:
   xerogel silica particles having a pore volume of from about 0.4 to about 1.5 ml/g, a median particle size of from about 10 to about 25 microns, and a surface area ranging from about 200 to about 900 m$^2$/g,
   wherein said composition has a particle size distribution such that the composition comprises (i) about 15% or less by weight fines, and (ii) a permeability of at least about 40 mDarcy.

19. The composition according to claim 18, wherein the xerogel silica particles (i) are mechanically milled, and (ii) have a surface area ranging from about 200 to about 550 m$^2$/g.

20. A composition according to claim 18, wherein said composition comprises a permeability of from about 50 mDarcy to about 200 mDarcy.

21. The composition according to claim 18, wherein said composition comprises 10% or less by weight fines.

22. A composition according to claim 1, wherein said composition comprises about 10% or less by weight of fines, and has a permeability from about 50 mDarcy to about 200 mDarcy.

23. A composition according to claim 7, wherein said composition comprises about 10% or less by weight of fines, and has a permeability of from about 50 mDarcy to about 200 mDarcy.

24. A composition according to claim 20, wherein said composition comprises about 10% or less by weight of fines.

* * * * *